F. G. HORNER.
TRACTOR SLED.
APPLICATION FILED JULY 18, 1917. RENEWED DEC. 6, 1918.
1,314,667.
Patented Sept. 2, 1919.
10 SHEETS—SHEET 2.
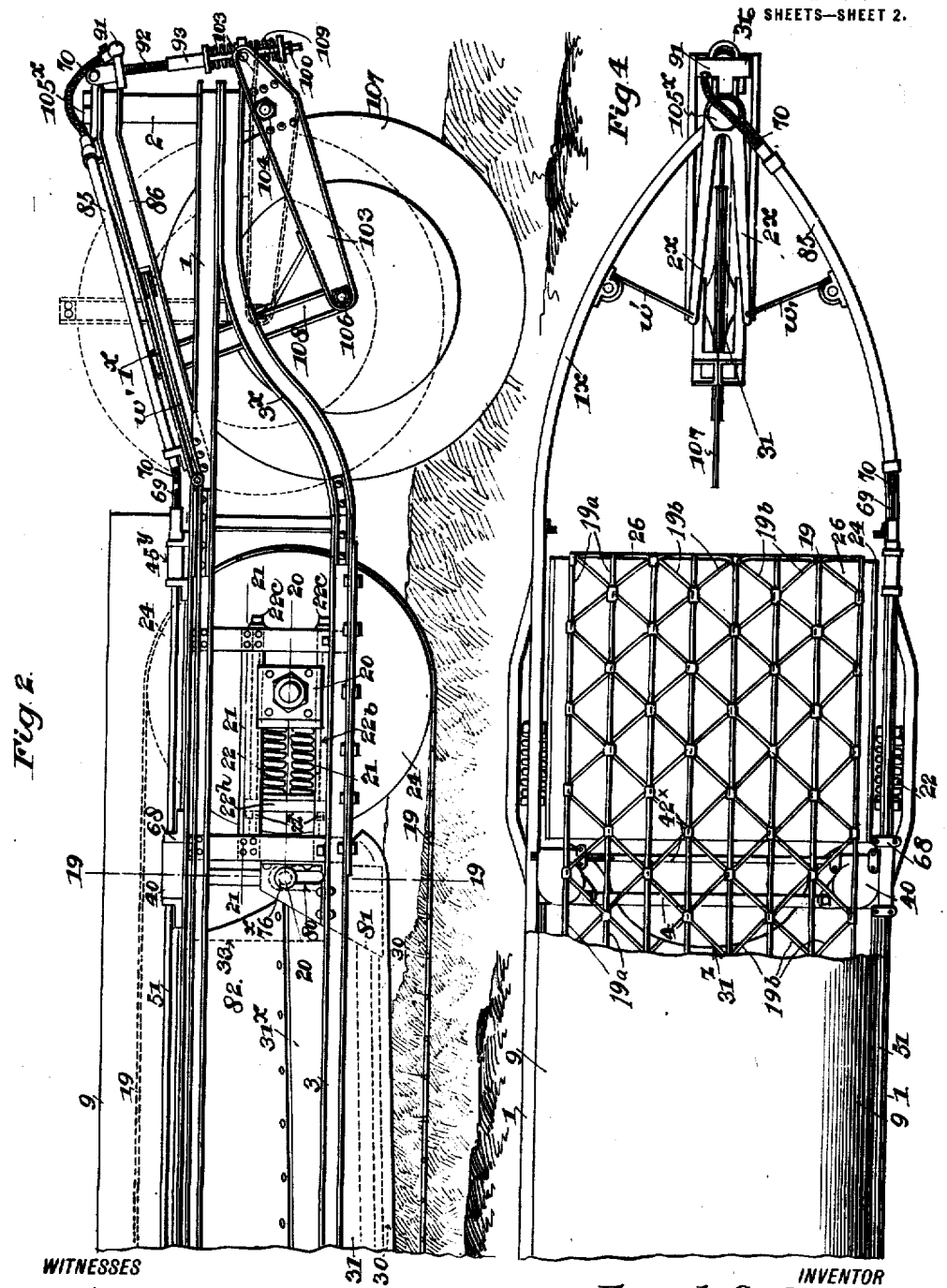
WITNESSES
John D. Schrott
W. E. Beck
INVENTOR
Frank G. Horner
BY Munn & Co.
ATTORNEYS F. G. HORNER.
TRACTOR SLED.
APPLICATION FILED JULY 18, 1917. RENEWED DEC. 6, 1918.
1,314,667.
Patented Sept. 2, 1919.
10 SHEETS—SHEET 3.
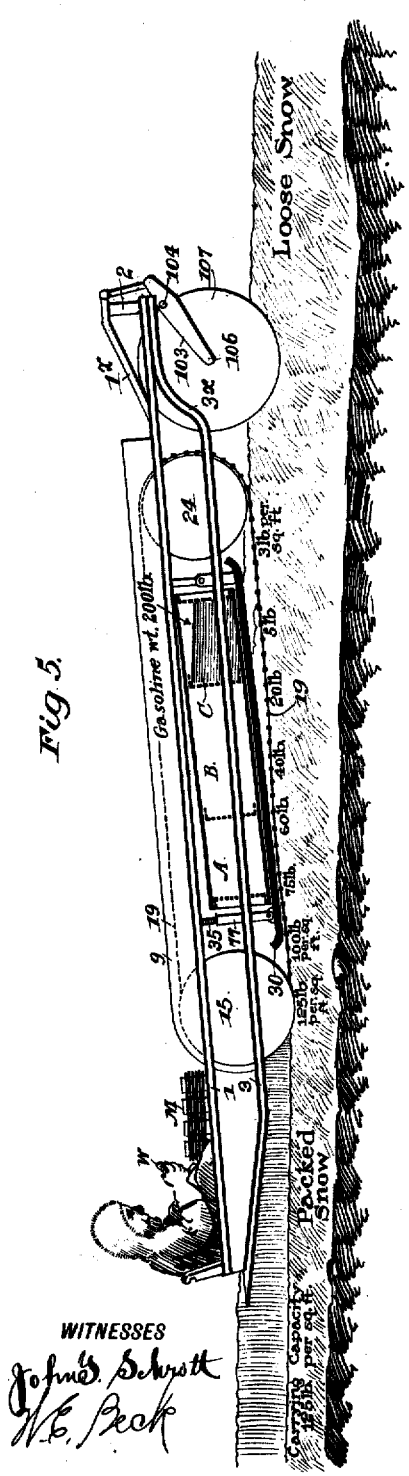
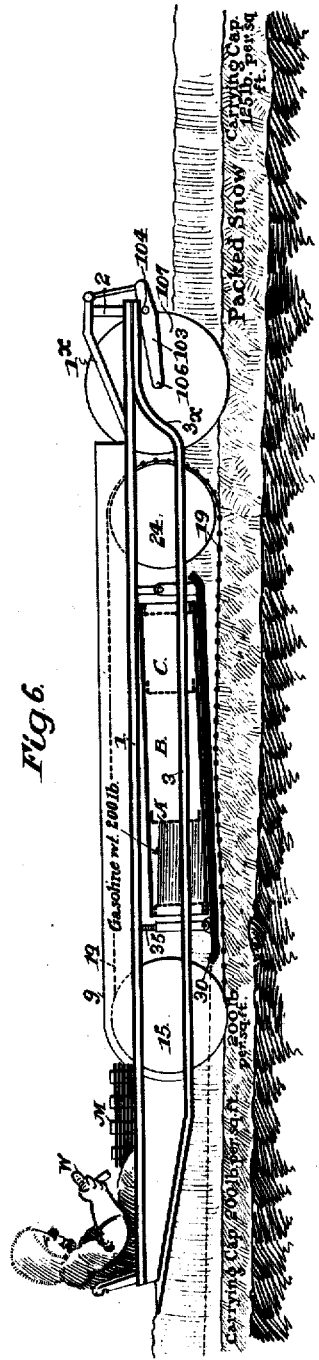
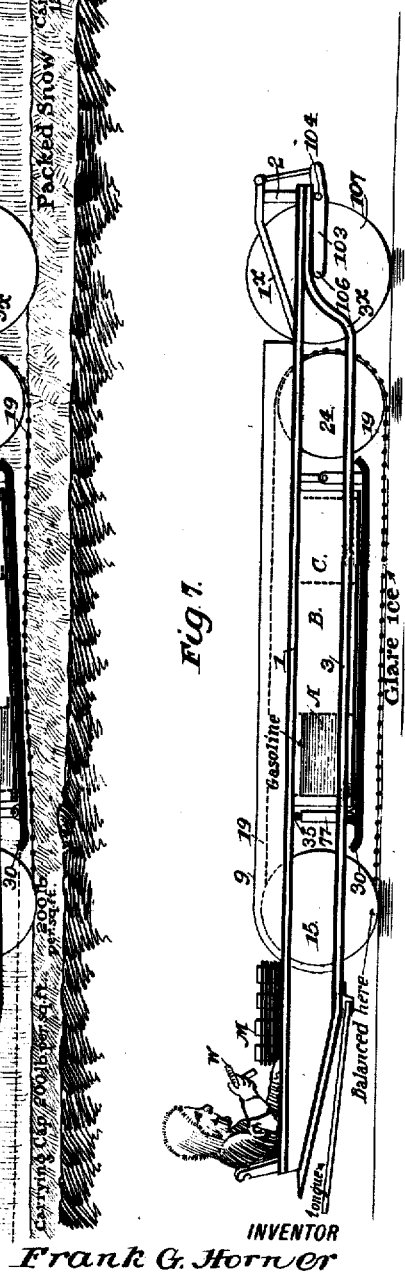
WITNESSES
INVENTOR
Frank G. Horner
BY
ATTORNEYS F. G. HORNER.
TRACTOR SLED.
APPLICATION FILED JULY 18, 1917. RENEWED DEC. 8, 1918.
1,314,667.
Patented Sept. 2, 1919.
10 SHEETS—SHEET 4.
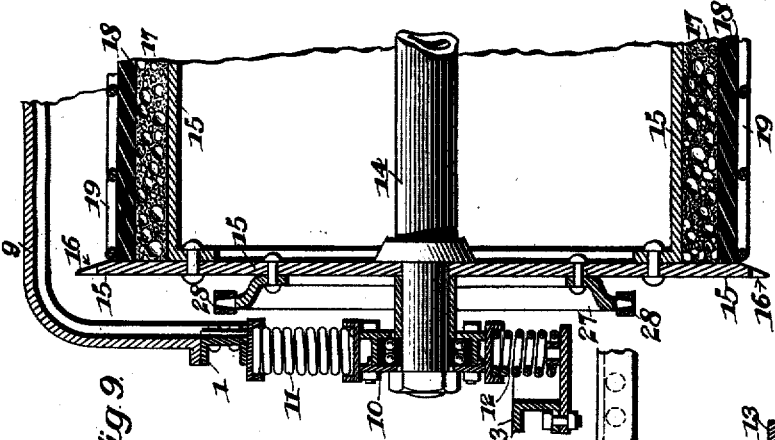
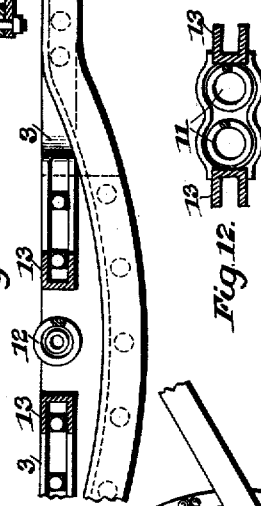
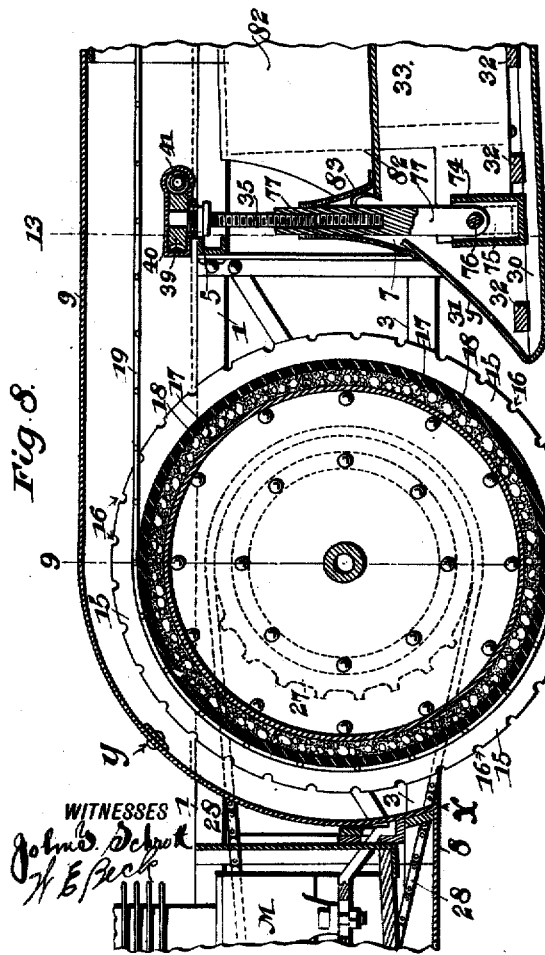
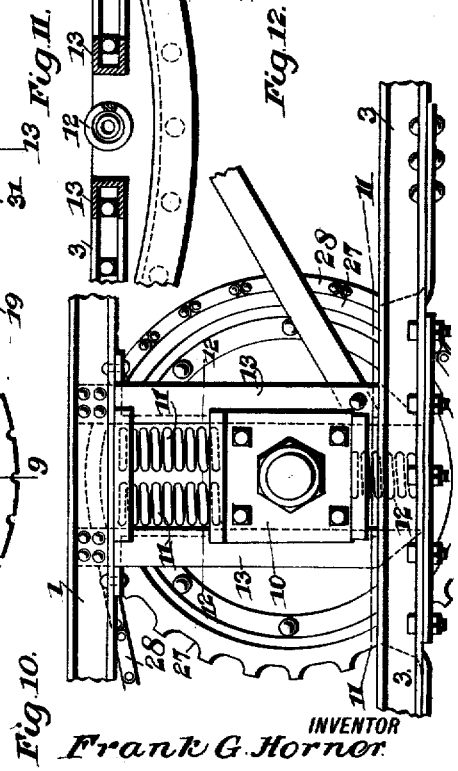
WITNESSES
INVENTOR
Frank G. Horner
BY
ATTORNEYS

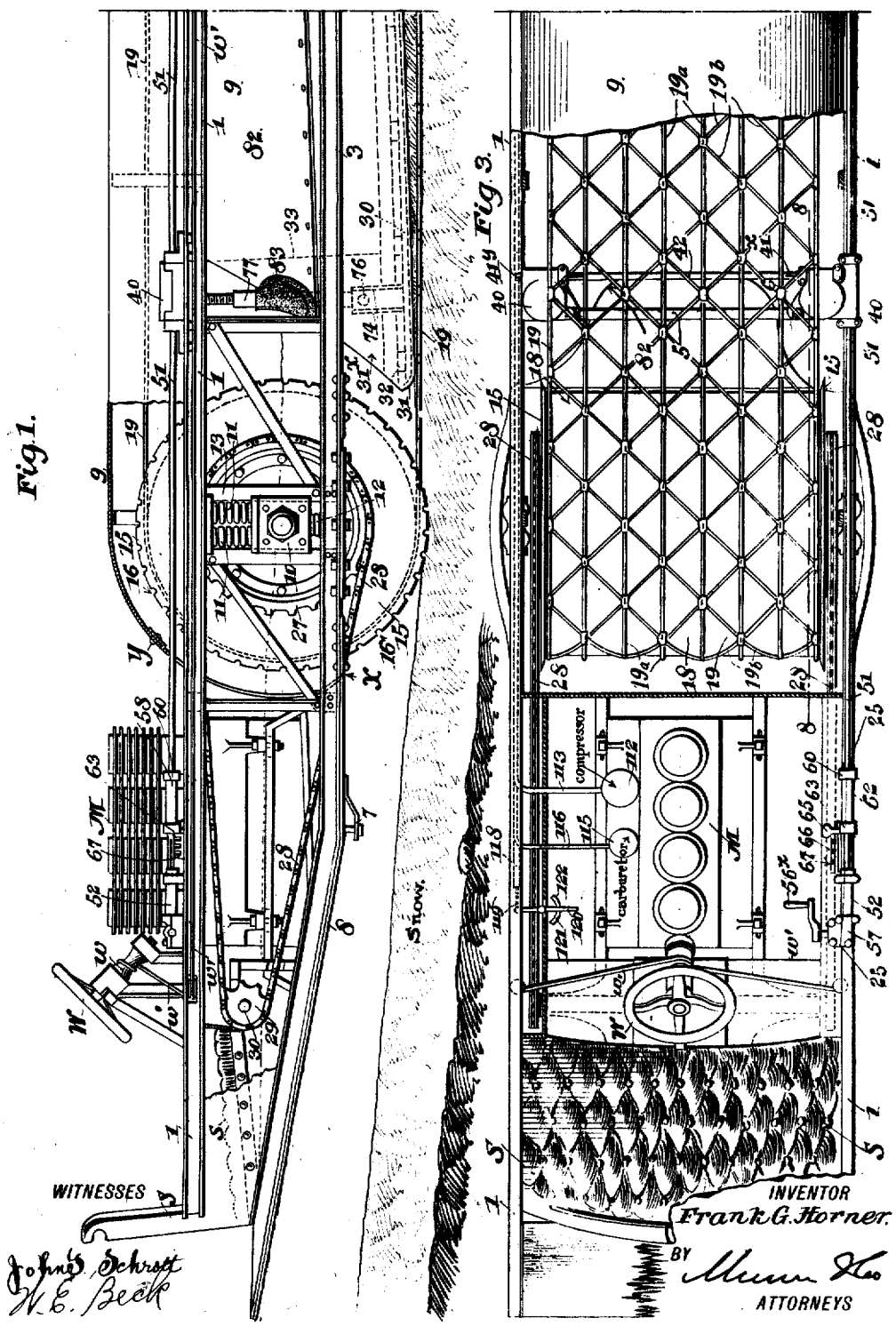

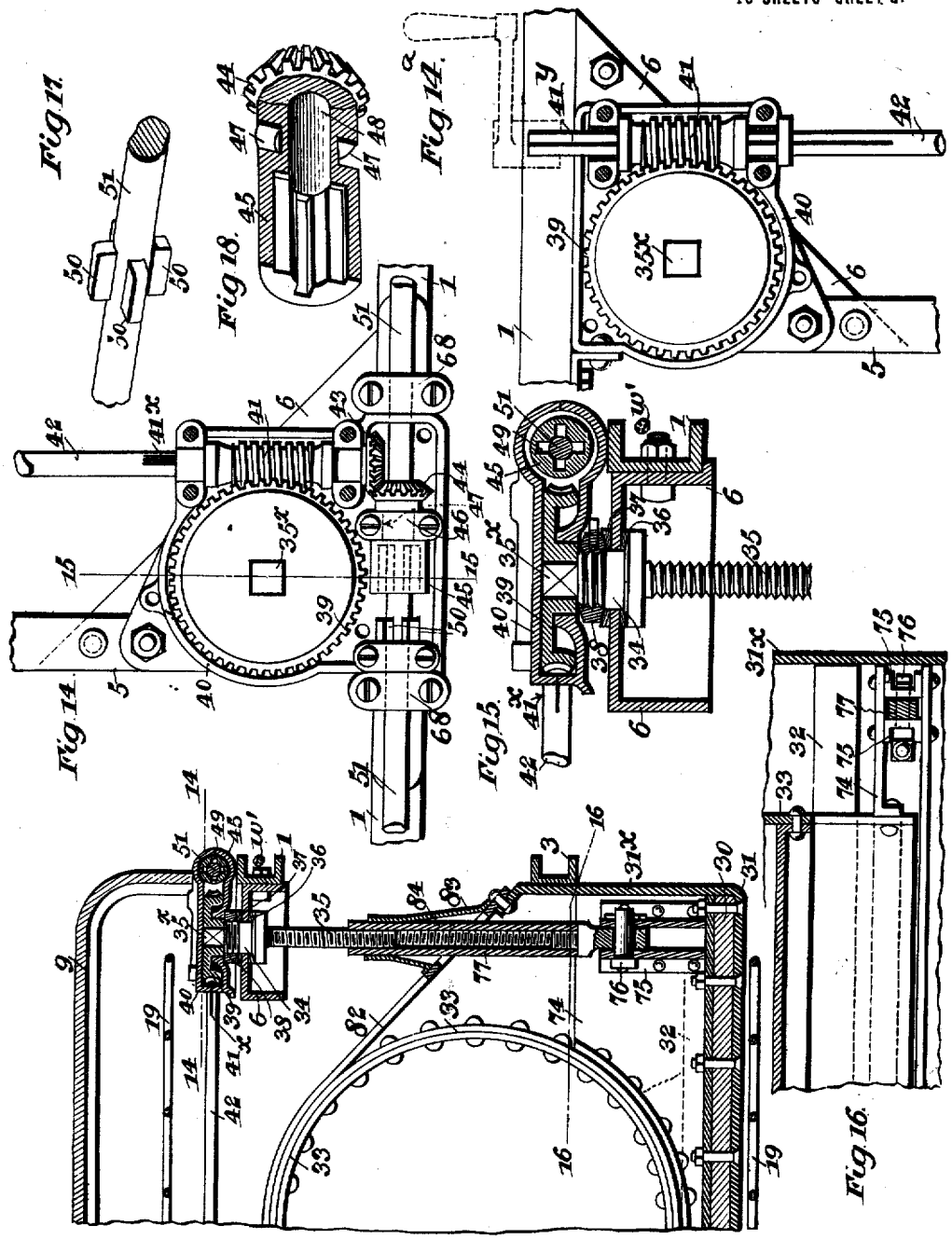

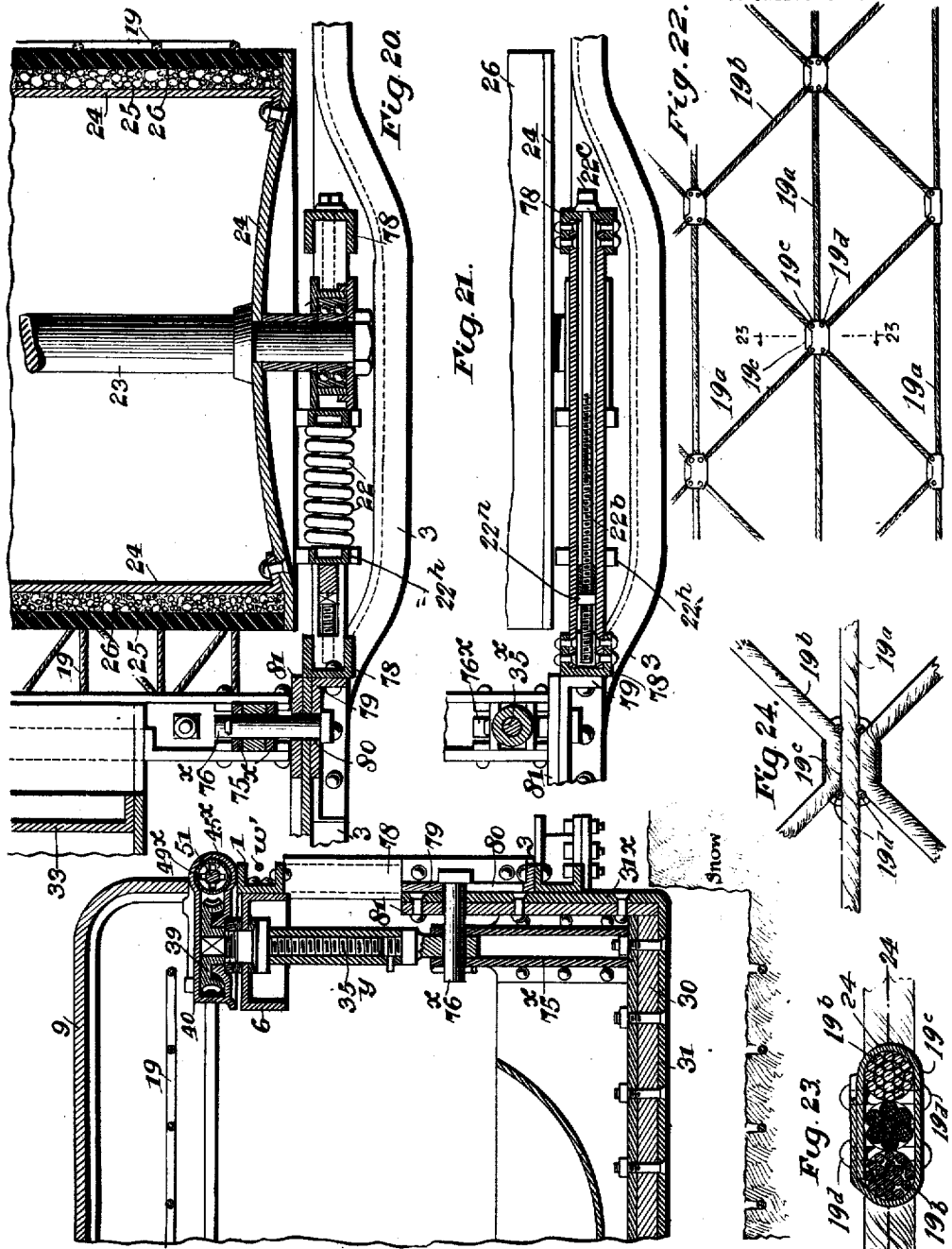

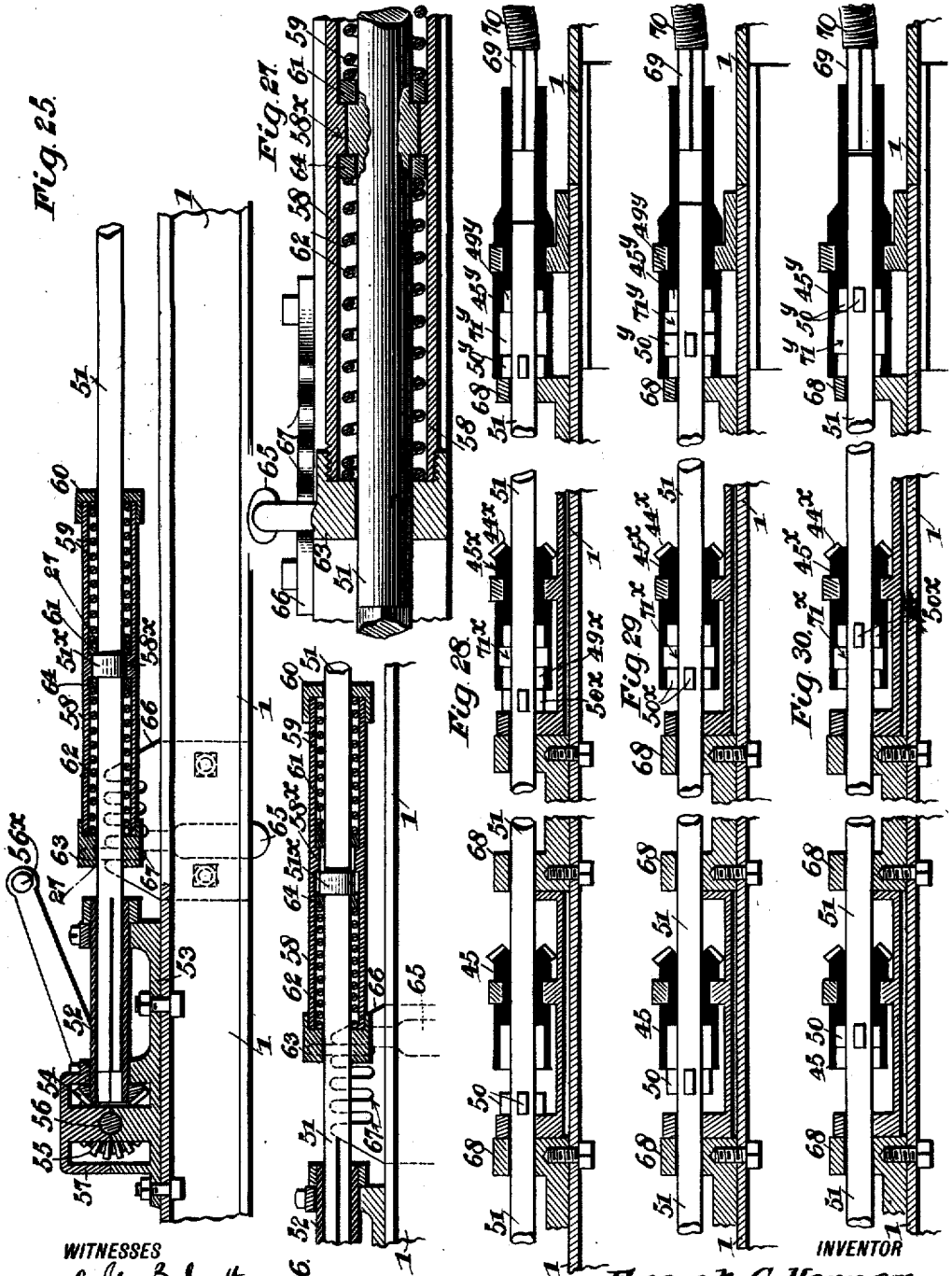

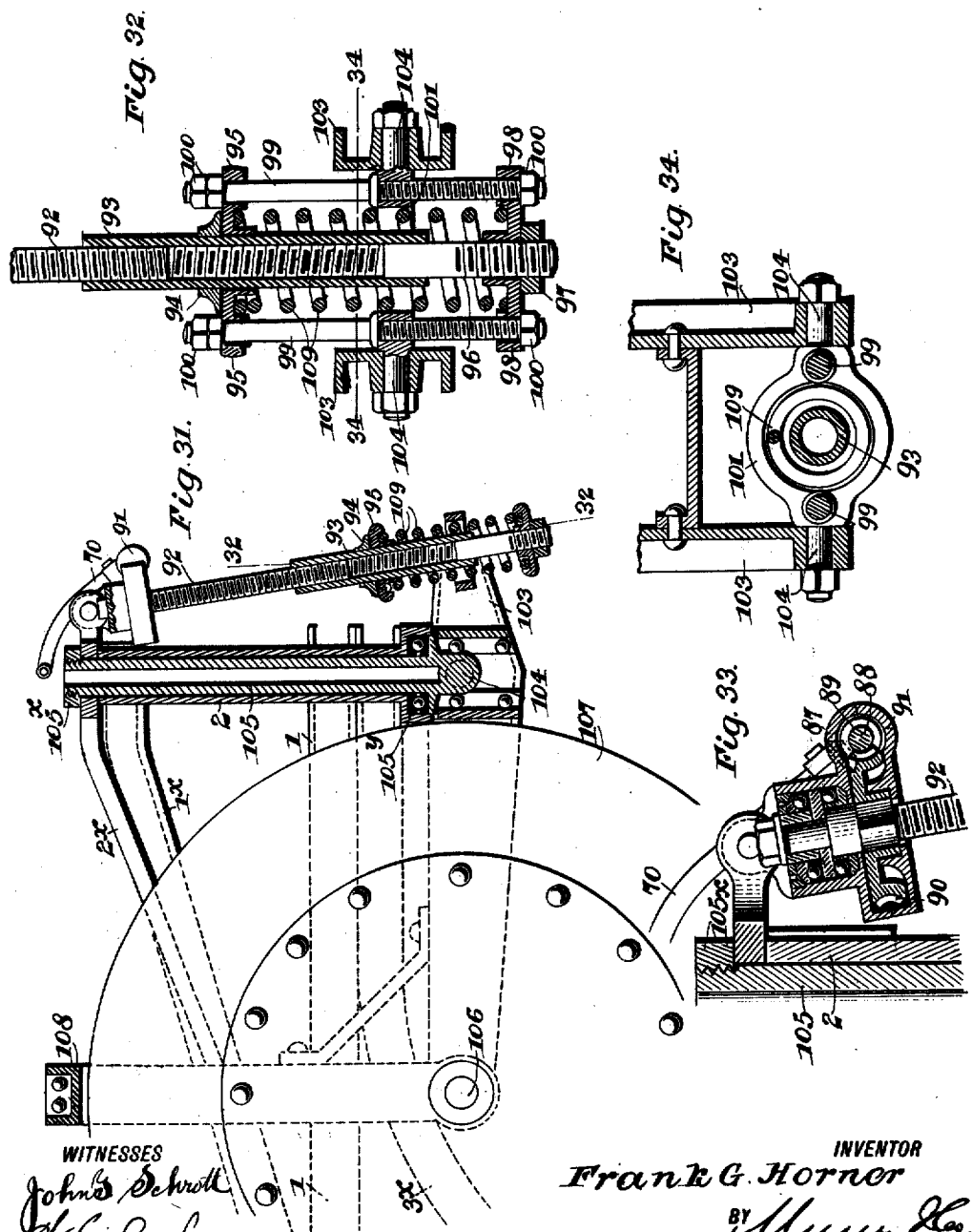

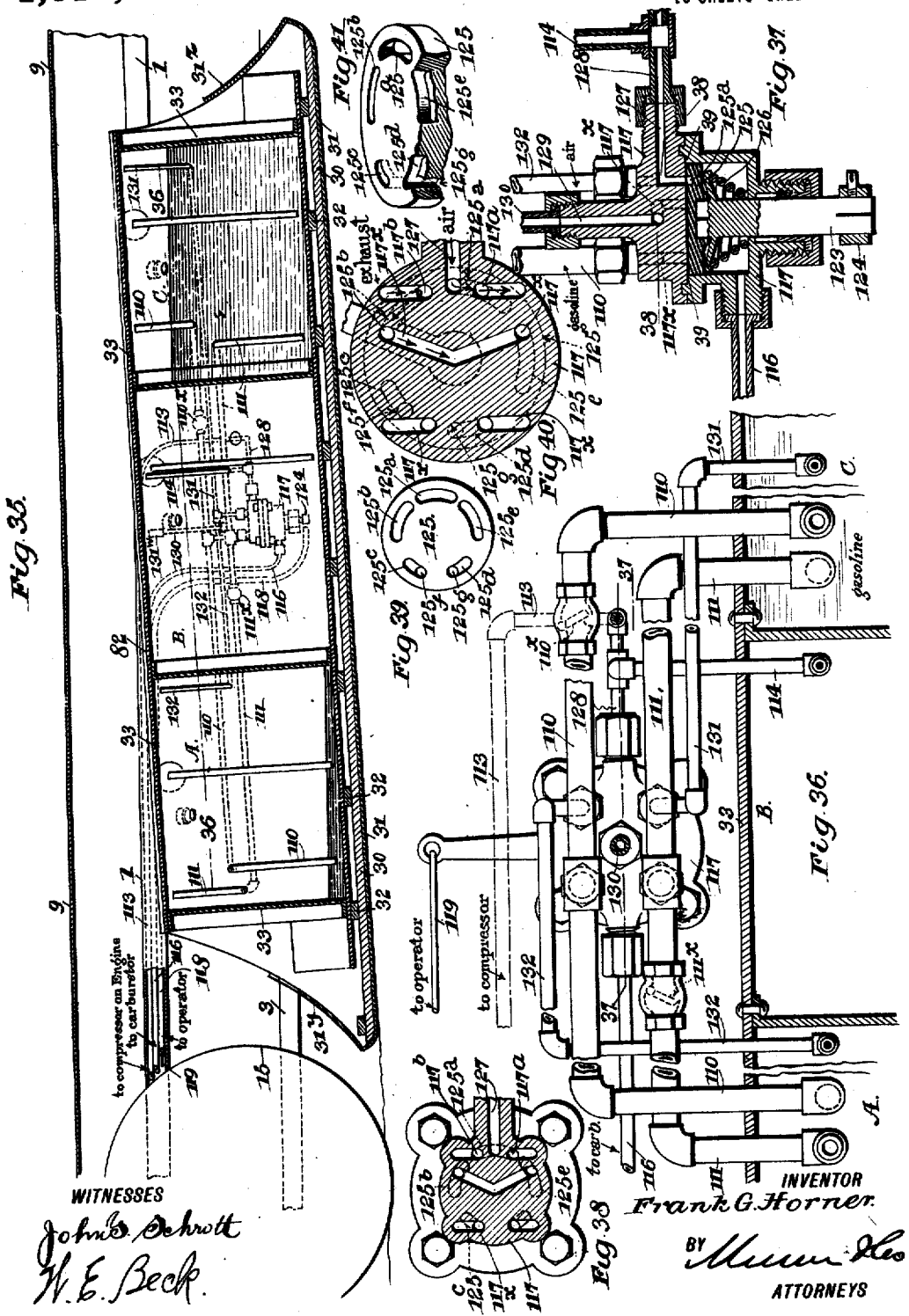

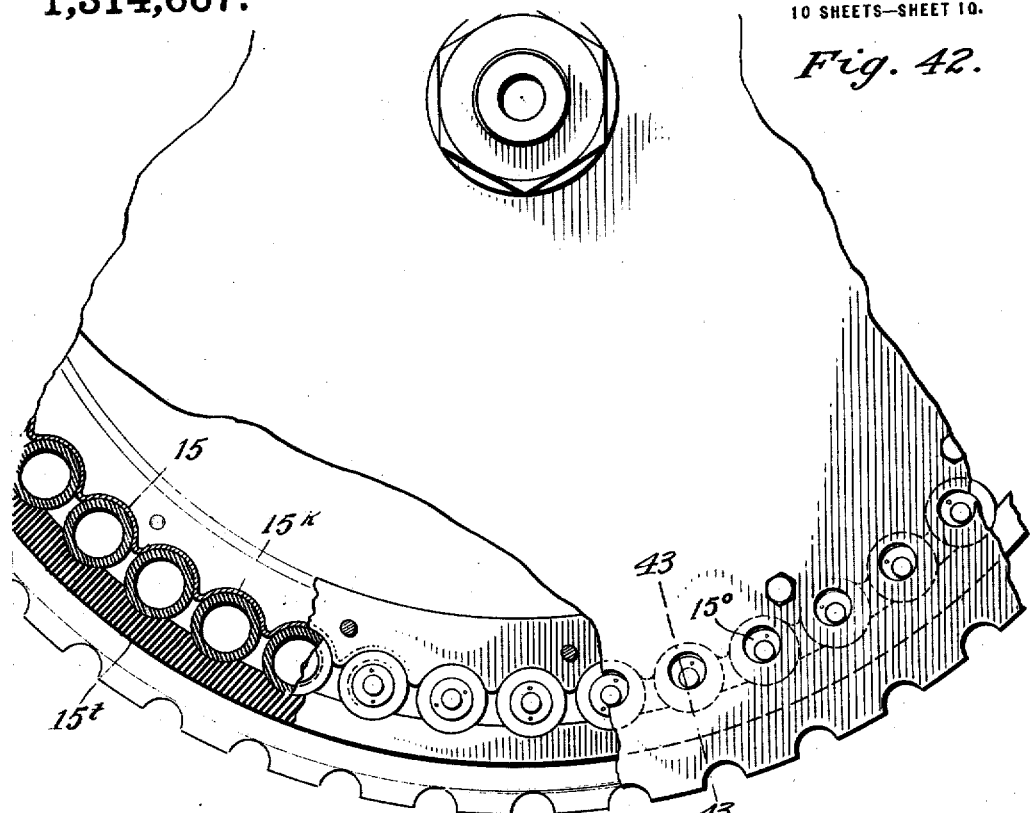
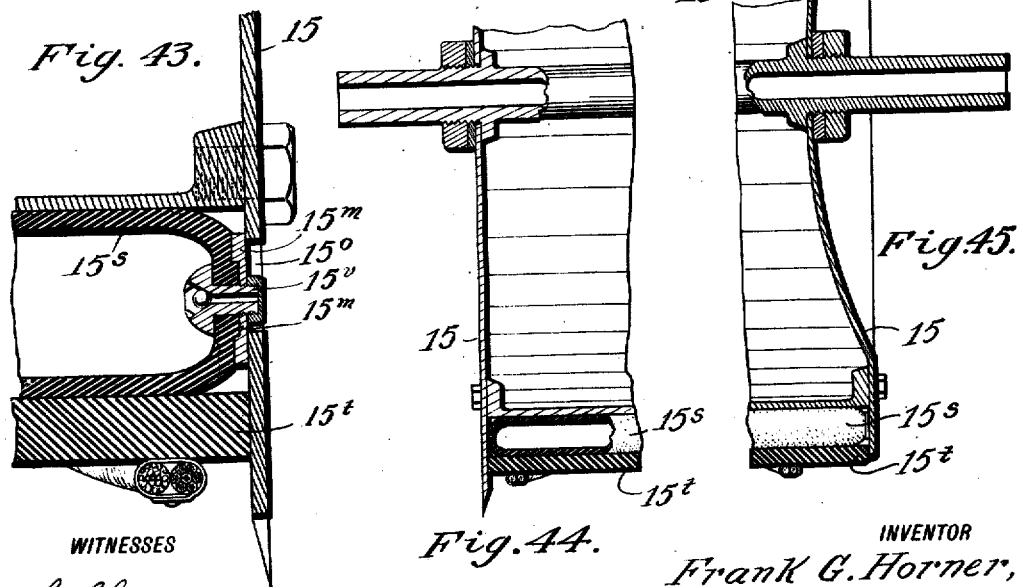

UNITED STATES PATENT OFFICE.

FRANK G. HORNER, OF RUBY, TERRITORY OF ALASKA.

TRACTOR-SLED.

1,314,667. Specification of Letters Patent. Patented Sept. 2, 1919.

Application filed July 18, 1917, Serial No. 181,414. Renewed December 6, 1918. Serial No. 265,644.

*To all whom it may concern:*

Be it known that I, FRANK G. HORNER, a citizen of the United States, and a resident of the city of Ruby, in the Territory of Alaska, have invented a certain new and useful Improvement in Tractor-Sleds, of which the following is a specification.

My invention relates to improvements in tractor sleds or toboggans, and it consists in the combinations, constructions, and arrangements herein described and claimed.

An object of my invention is to provide a tractor for breaking trails in snow, and it is primarily designed for use in northern countries where a large part of the traffic is carried on in winter over trails made in the snow.

A further object of my invention is to provide a motor sled or toboggan which is capable of having its center of gravity changed without the necessity of the driver of the sled getting out of the machine or without adding any extra weight.

A further object of my invention is to provide a tractor having an endless web by means of which the device is driven, the parts being so arranged that a maximum tractive effect is secured with a comparatively light medium.

A further object of my invention is to provide novel means for steering the tractor, which is capable of adjustment to meet different conditions.

Other objects and advantages will appear in the following specification, and the novel features of the invention will be particularly pointed out in the appended claims.

My invention is illustrated in the accompanying drawings, forming a part of this specification, and in which:

Figure 1 is a side view of the rear portion of the tractor;

Fig. 2 is a side view of the front portion;

Fig. 3 is a plan view of the rear portion;

Fig. 4 is a plan view of the front portion;

Fig. 5 is a diagrammatic side elevation showing the position of the machine when traveling through loose snow;

Fig. 6 is a view similar to Fig. 5, showing the machine traveling on packed snow;

Fig. 7 is a view similar to Figs. 5 and 6, showing the machine traveling on a "set" trail or on ice;

Fig. 8 is a section along the line 8—8 of Fig. 3;

Fig. 9 is an enlarged section along the line 9—9 of Fig. 8;

Fig. 10 is an enlarged side view of the rear journal box;

Fig. 11 is a section along the line 11—11 of Fig. 10.

Fig. 12 is a section along the line 12—12 of Fig. 10;

Fig. 13 is a section along the line 13—13 of Fig. 8;

Fig. 14 is a section along the line 14—14 of Fig. 13.

Fig. 14ª is a section similar to Fig. 14, on the opposite side of the tractor;

Fig. 15 is a section along the line 15—15 of Fig. 14;

Fig. 16 is a section along the line 16—16 of Fig. 13.

Fig. 17 is a perspective view of a portion of the selector shaft;

Fig. 18 is a perspective view of a section of one of the toboggan adjusting gears;

Fig. 19 is an enlarged section along the line 19—19 of Fig. 2;

Fig. 20 is an enlarged section along the line 20—20 of Fig. 2;

Fig. 21 is an enlarged section along the line 21—21 of Fig. 2;

Fig. 22 is a perspective view of a portion of the endless web;

Fig. 23 is an enlarged section on the line 23—23 of Fig. 22;

Fig. 24 is an enlarged section on the line 24—24 of Fig. 22;

Fig. 25 is an enlarged section on the line 25—25 of Fig. 3, showing the selector shaft in one position;

Fig. 26 is a similar view showing the selector shaft in another position;

Fig. 27 is a section along the line 27—27 of Fig. 25;

Fig. 28 is a diagrammatical sectional view showing the selector shaft in position to actuate the guide wheel adjustment;

Fig. 29 is a similar view of the selector shaft in position to actuate the adjustment of the front end of the toboggan;

Fig. 30 is a similar view showing the selector shaft locked;

Fig. 31 is an enlarged section on the line 31—31 of Fig 4;

Fig. 32 is an enlarged section along the line 32—32 of Fig. 31;

Fig. 33 is a section through the upper part of the adjusting mechanism shown in Fig. 31;

Fig. 34 is a section along the line 34—34 of Fig. 32;

Fig. 35 is a section through the gasolene reservoir;

Fig. 36 is a side view showing the pipes associated with the gasolene reservoirs;

Fig. 37 is a section along the line 37—37 of Fig. 36;

Fig. 38 is a section along the line 38—38 of Fig. 37;

Fig. 39 is a section along the line 39—39 of Fig. 37;

Fig. 40 is a section substantially similar to Fig. 38, but showing the valve in a different position;

Fig. 41 is a perspective view of the valve disk shown in Fig. 39.

Fig. 42 is a side view of a portion of a modified form of one of the drums, portions being broken away and in section for the sake of clearness;

Fig. 43 is an enlarged section along the line 43—43 of Fig. 42;

Fig. 44 is a section through a portion of the rear drum and tubes shown in Fig. 42;

Fig. 45 is a section through the front drum showing the valve end of the tube.

In carrying out my invention I provide a main frame consisting of upper longitudinal members 1 which are preferably made of channel iron, these members being bent at their forward ends, as shown at 1$^x$, and being secured to the steering post 2. Disposed underneath the longitudinal frame members 1 are frame members 3 also made of channel iron, these members being bent forwardly as shown at 3$^x$, in Fig. 2, and forwardly, being attached to the steering post 2 at a point immediately beneath the point of attachment of the upper frame members 1. The lower frame members are also curved inwardly and lie just beneath the upper members.

Secured to the upper longitudinal members 1 are transverse brace members, one of these members being shown at 4 toward the front of the machine, and the other member being shown at 5 toward the rear. At the intersection of the brace members 4 and 5 with the longitudinal frame members 1, are disposed triangular plates 6, see Figs. 14 and 14$^a$, these plates being flanged as shown in Fig. 13. The plates constitute corner braces and also means for supporting the toboggan proper.

Referring particularly to Figs. 1 to 4 inclusive, it will be seen that the motor M for driving the device is disposed toward the rear end of the machine. The steering wheel W and the operator's seat S are also located in the rear of the motor. The object is to weight down the rear end of the device. The rear ends of the side frame members 3 are bent upwardly and extend rearwardly to a point past the seat S. A platform is constructed in rear of the seat so that one may stand on the rear of the device to raise the front end in an emergency. The rear end is bent upwardly so as to provide room for the rear end of the device to swing downwardly when the front end is raised, as for instance in crossing a valley, creek-bed, or "draw." At 7 in Fig. 1 I have shown a coupling or clevis by means of which the trailers are drawn.

A sheet metal bottom 8 is secured to the lower portion of the members 3 at the rear edge of the seat and extends forwardly and underneath the rear ends of the side members 3 to a point marked "X" in Fig. 1. The sheet metal here is bent back upon itself and extends upwardly in a curve, which is substantially concentric with the axis of the tractor wheel, being joined at Y to the covering 9 which extends over the toboggan. The edge at X serves the purpose of a scraper should chunks of snow collect on the drive wheel.

Referring now particularly to Figs. 1, 2, 9, and 10, it will be seen that I have provided journal boxes 10 which are braced by upper springs 11 and by lower springs 12, these journal boxes being slidable vertically between the uprights 13 which are connected between the upper and lower frame members 1 and 3 respectively. The axle 14 bears a rear drum 15, the ends of the drum being provided with extensions having teeth 16 for use on hard packed trails or ice, as will be explained later. The drum 15 is provided on its exterior with a layer of sponge rubber 17, and this in turn has a layer of tire rubber 18. The endless web 19 passes over the drum and bears on the tire rubber layer 18.

In Fig. 20 I have shown the front drum. It has a journal 20 which is slidable in a horizontal direction on guides 21 and is normally pressed on by springs 22. The axle 23 supports the drum 24 which also has a layer 25 of sponge rubber under the outside layer 26 of tire rubber, over which the web 19 runs. The web 19 is an endless web, kept taut by means of the springs 22. The rear drum 15 is provided with an integral sprocket wheel 27 over which a sprocket chain 28 runs. The sprocket chain in turn passes over a sprocket 29 on the shaft 30 which is driven by the motor M. It will be understood, as shown in Fig. 3, that there are two of these sprocket wheels 27 and two sprocket wheels 28, one on each side of the device.

The toboggan comprises a board 30 which may be sheathed on the bottom with a metal sheet 31. This sheet 31 is turned up at the sides as shown at 31$^x$ in Figs. 13 and 19. It is also turned up at the rear as shown at 31$^y$ in Figs. 8 and 35, and at the front as shown at 31$^z$ in Fig. 35. A series of cross strips or buttons 32 is provided upon which is mounted a gasolene tank 33.

Referring more particularly to Figs. 13, 15, and 19, it will be seen that each of the braces 6, which has been mentioned heretofore, has an opening in which the head 34 of the screw shaft 35 extends. As will be seen from Fig. 15, the head has a lower portion which fits up against a concave washer 36 just underneath the surface of the brace member 6. Above this surface is another concave washer 37 while a lock nut 38 is provided. The end of the shaft 35 is squared, as shown at $35^x$, and upon the squared end is disposed a worm wheel 39 carried in a casing 40 which also houses a worm 41 which is provided with a central bore which is on the end of a transverse shaft 42. This transverse shaft extends across the machine and is provided with another worm 41 arranged to engage a worm 39 which is of the same construction and is designed to operate a screw shaft 35 precisely similar to that already described.

It will be observed that the shaft 42 is squared at both ends, as shown in Figs. 14 and 16 at $41^x$ and $41^y$ respectively, and that the squared end is extended in Fig. 16. This is for the purpose of ease in assembling the device, since the shaft may be pushed through one of the worms 41 until it can enter the inner end of the other worm, when it may be moved into the position shown in the drawings.

In Fig. 14 I have shown a grear 43 arranged to engage a gear 44 at the end of the sleeve 45. This sleeve is mounted in bearings 46. The bearings 46 have a portion which enters an annular groove 47, see Fig. 18, in the sleeve to prevent the endwise movement of the sleeve but to permit the rotation of the sleeve. The sleeve is provided with a central bore 48 and with radially extending slots 49 communicating therewith. These slots are arranged to receive radially extending lugs 50, see Fig. 17, on the selector shaft 51. The selector shaft 51 passes rearwardly and enters a sleeve 52 carried by and rotatable in a bracket 53 secured to the upper longitudinal member 1. The portion of the shaft 51 within the sleeve is squared so as to move longitudinally with respect to the sleeve but to rotate when the sleeve is rotated.

The end of the sleeve 52 bears a bevel gear 54 which is in mesh with a gear 55 on a shaft 56 carried in a casing 57, see Fig. 25. The shaft 56 bears a handle $56^x$ by means of which the gear 55 is rotated, thereby turning the selector shaft.

Surrounding the selector shaft is a sleeve 58 having a portion $58^x$ which corresponds with an enlarged portion $51^x$ of the selector shaft. A spring 59 is disposed on one side of the enlarged portion $51^x$ within the sleeve 58 and bears at one end on a cap 60, the opposite end bearing on a washer 61 disposed adjacent to the enlargement or collar $51^x$. A similar spring 62 bears on a cap at 63 at the opposite end of the sleeve and on a washer 64 adjacent to the collar or enlargement $51^x$. A handle 65 is provided by means of which the sleeve may be forced forwardly against the tension of the spring 62 or rearwardly against the tension of the spring 59. A locking plate 66 is secured to the frame member 1 and is provided with slots 67 arranged to receive a portion of the handle so as to retain the selector shaft in its shifted position.

It will be seen that when the handle 65 is moved forwardly, i. e., to the right in Fig. 25, it will move the sleeve 58 forwardly. As will be seen from Figs. 28, 29 and 30, the selector shaft 51 is mounted to slide in bearings 68, the front end of the selector shaft being disposed in a sleeve $45^y$. In Fig. 28 the end of the selector shaft 51 is shown as being at some distance from the squared end 69 of a flexible transmission 70, while in Fig. 30 the shaft 51 is shown close up to the end 69. This represents the amount of movement which the selector shaft may take when the handle 65, see Fig. 25, is moved from the first slot in the locking plate 66 to the last one. The selector shaft passes through a sleeve $45^x$ which is similar to the sleeve 45 and which bears a gear $44^x$.

The shaft 51 bears lugs $50^x$ which are arranged to enter slots $49^x$ of the sleeve $45^x$, while this shaft also bears lugs $50^y$ arranged to enter slots $49^y$ in the sleeve $45^y$. It will be observed that there are four positions of the selector shaft, three of which are illustrated in Figs. 28, 29 and 30. That illustrated in Fig. 28 shows the lugs 50 and $50^x$ clear of the sleeves 45 and $45^x$ while the lugs $50^y$ are in engagement with the slots in the sleeve $45^y$, so that by turning the handle $56^x$ the shaft 51 is rotated and hence the sleeve $45^y$.

In Fig. 29, the lugs 50 are still out of engagement with the sleeve 45, the lugs $50^x$ are in engagement with the slots in the sleeve $45^x$, while the lugs $50^y$ within the sleeve $45^y$ have passed to a position where there is an enlargement $71^y$ in which the lugs 55 turn idly. This will connect the sleeve $45^x$ to the selector shaft. When the shaft is moved to its third position, it will be obvious that the lugs 50 will be in engagement with the sleeve 45 while the lugs $50^x$ and $50^y$ respectively will be in registration with enlarged recesses $71^x$ and $71^y$, respectively, thereby locking the sleeve 45 to the selector shaft 51, and turning it when the latter is rotated. This condition is not shown in the drawings, Figs. 28 and 29 being sufficient to illustrate the operation of the device.

The fourth position is the neutral position in which the sleeves 45, 45ˣ and 45ʸ are all locked to the shaft 51. This is the normal running condition.

As will be seen from Figs. 3 and 4, there are two transverse shafts, a rear one which is shown at 42, and which has already been described, and a front one at 42ˣ. The front shaft is precisely similar to the rear one, and the means for turning the screw 35 is duplicated at the ends of the cross shaft 42ˣ in turning the screw which corresponds with the screw 35.

A comparison of Figs. 13 and 19, however, will show that the means of suspension of the rear and the front of the toboggan is different. In Fig. 13 I have shown a plate 74 which is cut away to support the gasolene tank 33. Brackets 75 secured to the plate 74 carry a pin 76 to which the lower end of a sleeve 77 is pivotally secured. The interior of this sleeve 77 is threaded to receive the screw 35. It will be apparent that when the screw 35 is turned the toboggan will be raised or lowered, depending upon the direction of rotation.

On the opposite side of the tank there is a similar construction for suspending the rear end of the toboggan, and for raising it and for lowering it.

As has been before explained, the shaft 42 which controls the means for raising or lowering the rear end of the toboggan is actuated through the rotation of the sleeve 45. Similarly the sleeve 45, when rotated, will accomplish the rotation of the shaft 42ˣ, and this will raise or lower the front end of the toboggan. In Fig. 19 I have shown the pin 76ˣ as being disposed in brackets 75ˣ. The pin 76ˣ forms a connecting means between the front end of the toboggan and the frame. To this end, the upper and lower frame members 1 and 2 respectively are provided with a vertically extending strut 78 to which a plate 79 is secured. The lower portion of this plate is also secured to the member 3. The plate 79 is provided with a vertical slot 80 through which the pin 76ˣ passes, and by means of which the vertical adjustment of the toboggan is effected. A brace member 81 is secured to the inner side of the frame 31ˣ. The opposite side of the toboggan is suspended in the same way, and is attached to the main frame in a similar manner to that already described.

The tank 33 is held in position by a piece of sheet metal 82, which is secured to the upper edges of the sides 31ˣ, see Fig. 13, and which is in close contact with the gasolene tank. This forms in fact a cover for the entire toboggan. It is provided with openings 83 through which the sleeves 77 extend, shields 84 of flexible material, such as leather, being provided, which engage the upper ends of the sleeves so as to prevent snow from entering underneath the metal sheet 82.

Referring now particularly to Figs. 2, 28 to 30 inclusive, and 31, it will be seen that the flexible shaft 70 extends through a housing tube 85 which is carried by an upwardly inclined brace member 86 secured to the top of the steering post 2. At the end of the flexible shaft 70 is secured a bevel gear 87, see Fig. 33, arranged to engage a bevel gear, not shown, on the shaft 88 of a worm 89 which is in mesh with a worm wheel 90 carried in the housing 91. This housing 91 also forms a casing for the worm. The gear 90 is fixed to a screw shaft 92 which extends into a threaded sleeve 93. The sleeve has fixed to it a collar 94, while surrounding the sleeve and loosely slidable thereon is a larger collar or plate 95. At the opposite end of the sleeve is a pin 96 which enters the sleeve and which is securely fastened in place to the sleeve, the end of the pin being threaded and being provided with a nut 97. A movable plate or collar 98 surrounds the pin and is slidable with respect to the latter. Screw bolts 99 pass loosely through the openings in both of the collars at plates 95 and 98, nuts 100 being fastened to the ends of the bolts.

Secured to the screw bolts between the collars or plates 95 and 98 is a ring 101, see Fig. 34, this ring being threaded to receive the threaded portions of the screw bolts 99, the ring having trunnions 102 which are secured to arms 103 pivoted at 104 to the bottom of the steering rod 105. This steering rod 105 is disposed within the steering post 2, see Fig. 31. The opposite end of the arms 103 support the axle 106 of the steering wheel 107. In order to brace the device securely, I provide a U-shaped brace member 108 which is made of channel iron, and which extends across the top of the wheel 107. The steering rod 105 is held by means of a nut 105ˣ, see Fig. 31, and the lower end has a thrust bearing 105ʸ.

From the description it will be seen that when the shaft 70 is turned, the screw shaft 92 will be turned, and this will cause the movement of the arms 103 in their trunnions 104, so as to raise or lower the steering-wheel 107, depending upon the direction in which the shaft 70 is turned. It will also be apparent that, when the steering wheel encounters an obstruction which tends to raise it, the ring 101, and hence the screw bolts 99, will be forced downwardly, moving the plate 95 downwardly and compressing the spring 109 against the lower plate 98. When the wheel 107 goes down, then the ring will be forced in the opposite direction, and will move the plate 98 upwardly and compress the spring 109 against the plate 95. It will thus be seen that the spring 109 acts as a buffer or cushion for the shocks and jars of the wheel 107, while at the same time the wheel may be raised or lowered from the driver's seat in the manner described, without at all interfering with this spring or cushioning effect.

It is of prime importance that the center of gravity of the device be changed to meet different conditions without getting out of the machine, and without adding extra weight. This is done by shifting the gasolene from one end of the tank 38 to the other. In Fig. 35 I have shown the tank as being divided into a rear compartment A, a center compartment B, and a front compartment C. The center compartment is for compressed air, while the end compartments are for gasolene. It will be observed that there is a pipe 110 which extends from the lower part of compartment A, thence forwardly and upwardly, and terminates near the top of the compartment C. Another pipe 111 extends from the lower part of compartment C rearwardly and then upwardly, and terminates near the upper part of compartment A. These are the pipes by means of which transfer of gasolene from one compartment to the other is effected. The medium for moving the liquid is compressed air.

In Fig. 3 the compressor is shown at 112. A pipe 113 extends forwardly to the side of the tank, thence downwardly, see Fig. 35, and by means of a pipe 114 which terminates at the top of the air chamber, compressed air is admitted to the compartment B, the pipe 114 being joined to the pipe 113 by means of an elbow as shown in dotted lines in Fig. 35.

The carbureter 115 is connected to the pipe 116 with a valve casing 117, see Fig. 37. A tube 118, see Fig. 35, has disposed within it a flexible wire 119 which runs rearwardly and which connects with a lever 120, see Fig. 3, which is pivoted at 121 and which is provided with a locking segment 122.

On moving the lever 120 a valve stem 123, see Fig. 37, may be moved through the medium of a lever arm 124. This valve stem bears at its top a valve plate 125 which is normally held against its seat by means of a spring 126. The valve casing 117 is provided with an air inlet passage 127 which communicates with an air pipe 128. It is also provided with an exhaust passage 129 which communicates with an exhaust pipe 130.

The valve plate 125 is shown in detail in Fig. 41, as will be seen. It is provided with a series of grooves $125^a$, $125^b$, $125^c$, $125^d$ and $125^e$. At the adjacent ends of grooves $125^c$ and $125^d$ are openings $125^f$ and $125^g$ respectively which extend through the plate. The other three grooves have no such openings.

The valve plate 125 is rotatable within the casing, so as to bring the grooves into or out of registration with certain passages in the body portion of the valve casing 117.

The valve is so arranged that the carbureter is in communication at all times with the compartment which contains gasolene so as to permit the flow of gasolene to the carbureter unrestricted. To this end I provide the gasolene pipes 110 and 111, the former communicating with the groove $125^c$ and the latter with the groove $125^d$. These openings register with openings in the body portion of the valve 117, thrown in dotted lines in Fig. 37 and which communicate with the pipes 110 and 111 respectively. In Fig. 37 there is one of these openings $117^x$ which communicates with the gasolene pipe 110.

In the neutral position of the valve, that is to say, when the pressure of the air is the same in the three compartments and when the gasolene will be drawn from either of the compartments which has the most gasolene in it, the openings $125^f$ and $125^g$ will be in registration with both of the openings or passages leading to the gasolene pipes 110 and 111. When, however, the valve is turned one of the pipes is shut off, while the other remains in communication due to the presence of the grooves $125^c$ and $125^d$.

Let us assume that the gasolene is in the front tank and we wish to transfer it to the rear tank. The valve plate 125 is rotated so as to bring the groove $125^d$ in registration with an opening $117^d$ of the valve casing 117. This permits the gasolene tank to have communication with the carbureter through the pipe 111, while the pipe 110 is shut off from communication. At the same time air is admitted through the pipe 114 to the pipe 128 which leads to the air passage 127. The air passes downwardly into the groove $125^a$, thence along the groove and upwardly through the opening $117^a$, thence through the pipe 131, see Figs. 35 and 36, and into the top of the chamber or compartment C. At the same time the air in the compartment A passes into the pipe 132 thence into the passage $117^b$ through the groove $125^b$ through the opening $117^x$ and by the radially extending passage to the outlet 129, and thence to the pipe 130, which leads to the whistle $131^w$, see Fig. 35.

The exhaust of the air from the compartment A sounds the whistle and this keeps on sounding as long as fluid is being transferred. When, however, the fluid reaches the upper part of the pipe 132, it will choke the whistle and the sound will stop. The driver of the vehicle will then know that the transfer has been completed.

In order to transfer the liquid from the rear tank to the front tank, the valve is turned in the opposite direction, so that air is admitted under pressure into the rear tank, and is exhausted from the front tank. When the valve is in the position shown in dotted lines in Fig. 38 (this being a section through the valve casing), both compartments A and C will be in communication with the pipe 116, so that gasolene will be delivered from the tank which has the greater quantity, as stated before. It will be observed that the pipe 110 is provided with a check valve 110$^x$, while the pipe 111 is provided with a similar check valve 111$^x$. These check valves are necessary, since they prevent the air from being forced through the pipe when the air pressure is transferred from one chamber to another and cause the gasolene to be forced up through the other pipe and past its check valve. When both compartments are in communication with the pipe 116, it is obvious that the one delivering gasolene to the carbureter has the greater head, or, in other words, the gasolene comes from the compartment to the pipe 116 by the path of least resistance.

From the foregoing description of the various parts of the device, the operation thereof will be readily understood. Let us consider that the device is being used on freshly fallen or loose snow, such as that shown in Fig. 5. The steering wheel 107 is lowered by means of the handle 56$^x$, the handle 65 having been previously set in the slot 67 of the locking segment 66 which will bring the selector shaft into the position shown in Fig. 28. Now, it may be that when the handle 65 is pushed forwardly to bring the clutch members 50$^y$ into engagement with the sleeve 45$^y$, see Fig. 28, these clutch members may be in such position as to engage the end of the sleeve instead of entering the slots in the sleeve. It is for this reason that the sleeve 58 is provided, see Fig. 25. This sleeve will be moved by the handle 65, so that pressure will be exerted against the selector shaft and the lock, on the first rotation, will come into position to permit the entrance of the clutch members 50$^y$ in the slots in the sleeve 45$^y$, thereby effecting connection with the flexible shaft 70 to permit turning of the screw shaft 92 so as to lower the wheel 107.

The gasolene or other suitable liquid fuel is forced into the forward compartment C. An inspection of Fig. 5 will show how the weight is distributed. It will be seen that the greatest weight is directly underneath the driving drum 15 and that the pressure decreases toward the front so that the front drum 24 has very little pressure on it. The endless web 19 is pressed down through the loose snow and the latter enters between the web and the toboggan. It will be noted that at the rear end of the toboggan the web is close to the latter. The passage of the web through the snow and the fact that the toboggan is pressing downwardly on the snow, tend to give to the web a grip or traction which it otherwise would not have. The snow is packed down the full width of the toboggan, and the power required to force the device through the snow is less than it would be where the snow is pushed bodily ahead of the device.

In breaking trails through the loose snow it is desirable to go over the trail a second time before the snow on the trail has "set." The trail will of course be packed to a certain extent, and will be much more capable of holding up the tractor. In Fig. 5 the device is shown in position to pass forwardly so as to cause the loose snow to be packed down, in other words, to ride over the loose snow. In Fig. 6 I have shown the device on the trail which has been broken, but which has not been allowed to "set." In this figure the fuel is shifted from the front compartment C to the rear compartment A. Furthermore, the wheel 107 is raised.

In Fig. 5 the gasolene was placed in the front compartment in order to have enough weight at the front of the device to cause the steering wheel 107 to take hold and be effective for steering purposes. In Fig. 6 the gasolene is shifted to the rear tank because it is desired to add weight in order to drive the roller and compress the trail and pack it much more closely. The fact that the trail is partly packed does not necessitate the weight in the front of the machine that it does in traveling through loose snow.

After passing over the trail a second time it is allowed to "set" for a few hours and is then hard enough to support dog teams or other means or other ordinary means of traffic in northern countries.

In Fig. 7 I have shown the position of the parts when the device is used on a packed trail or on ice. In this position it will work as a tractor to draw loaded sleds or similar devices. It will be observed that the steering wheel 107 is raised and that the toboggan is raised at the rear and at the front, while the web 19 rests on the surface of the ice. It is desirable to have the tractor as light as possible in order that it may be easy to steer it and at the same time afford an efficient means for tractive purposes. The weight will be practically carried on the rear drum and on the front steering wheel, making it easy to steer.

In order to be able to adjust the tension of the springs 22 which bear on the slidable journal so as to keep the web in a taut condition, I provide a slidable head 22$^h$ upon which these springs bear. Bolts 22$^b$ are provided at each end of the head 22$^h$, these bolts being provided with square heads 22$^c$. The bolts are provided with nuts 22$^a$ which bear against the head 22ʰ and which cause the latter to move forwardly when the heads 22ᶜ are turned.

The steering wheel W has a drum w around which is wound a cable w'. This cable extends over pulleys in the upper side frame members 1 and thence forwardly in the channel, thence inwardly to arms 2ˣ secured to the steering rod 105.

I have provided means whereby the adjustment of the rear end, or the adjustment of the front end, or the adjustment of the steering wheel may be accomplished independently of the selector shaft. Thus, in case the selector shaft should be broken, I may apply the handle to the squared ends, such as that shown at 41 in Fig. 14ᵃ, having first moved the clutch member of the selector shaft to engage the clutch member for driving the particular cross shaft, such as that shown at 42. Now, by means of the handle, the adjustment may be effected. The handle is used for any of the adjustments mentioned above.

I have referred to the web 19 as being the main traction member. I desire to call special attention to the manner in which this web 19 is constructed. It consists of a series of longitudinal cables made of the best steel, these cables being shown at 19ᵃ, which are joined by means of diagonal brace cables 19ᵇ. These bracing cables consist of a single strand of twisted wires as shown in Fig. 23, while the cables 19ᵃ are composed of a plurality of strands, six strands being shown in Fig. 23 with a hemp center. The cables 19ᵃ are flexible so as to pass easily around the drums, while the cables 19ᵇ are stiff but will bend and will spring into position again when the tension or strain is released, thus keeping the web substantially in its flat form as soon as it has passed around the drum. The bracing cables 19ᵇ are secured to the longitudinal cables 19ᵃ by means of clamps such as those shown at 19ᶜ in Fig. 23. These clamps are in reality loops of metal which are bent around the cables 19ᵃ and 19ᵇ in the manner shown and which are held in place by means of securing devices such as rivets 19ᵈ. This gives a flexible web which at the same time is so placed as to retain its shape under severe lateral strains. It will be observed that the rivets 19ᵈ are so disposed as to prevent any slipping of the brace members 19ᵈ with respect to the longitudinal cables 19ᵃ.

The device described thus far is used primarily in temperatures that do not fall below thirty degrees below zero Fahrenheit. When this is exceeded, however, I find that the snow has a tendency to become crushed in such a way that it will adhere in fine particles to the surface of the drum and gradually build up an icy coating on the outside of the drum which, if not removed, will cause the stretching or breaking of the web due to the enlargement of the drum. If, however, the surface of the drum is soft so as to move under load then this ice coating is not formed, because the particles of ice will break under such movement and will fall off.

In order to make a drum having a surface which is relatively soft at a low temperature I provide a construction like that shown in Fig. 42. In this figure the surface of the drum is corrugated as shown at 15ᵏ, these corrugations being parallel with one another and also to the longitudinal axis of the drum. On the outside of the drum and spaced from the corrugated part is a resilient covering 15ᵗ which is preferably made of a fabric with enough rubber to hold it together. This outer covering 15ᵗ is also corrugated or provided with grooves facing those on the drum and arranged to register with them. Disposed in the space between the drum and the covering 15ᵗ is a series of pneumatic tubes 15ˢ, these tubes being held in the grooves and each tube being separate and independent of any of the other tubes. Each tube is provided with a valve 15ᵛ whose stem extends through the end of the tube 15ˢ, a screw cap 15ᵐ being provided which binds the valve to the end of the tube and which also serves as a buffer to prevent injury of the tube by the side of the drum 15. As will be seen from Fig. 42 an opening 15ᵒ is provided in the side of the drum 15, and in this opening is disposed a second screw cap 15ʷ. The valve is disposed concentrically with respect to the opening 15ᵒ so that when the tube is compressed the valve will have room to play. Each of the tubes is closed at the end opposite the valve.

In Fig. 44 I have shown the rear drum provided with tubes like that shown at 15ˢ. In Fig. 45 the drum is shown with similar tubes 15ˢ.

The operation of this form of the device is as follows:—

The tubes 15ˢ are pumped up to the desired pressure and this keeps the covering 15ᵗ spaced from the drum. The fact that the covering as well as the drum is corrugated and that the tubes fit into these corrugations keeps the covering from rotating with respect to the drum. Now when the snow is powered and tends to adhere to the surface of the drum, the movement of this surface will crack and break up the brittle snow or ice covering, thus keeping the drum free from the accumulation of ice.

If one of the tubes 15ˢ should be punctured it will not affect the remaining tubes which will still retain their resiliency and will be maintained in the same relative position.

I claim:—

1. A tractor sled comprising a frame, a pair of drums rotatably disposed in the frame, an endless tractor belt arranged to run on said drums, and a toboggan disposed between the drums, said toboggan being carried by said frame.

2. A tractor sled comprising a frame, a pair of drums rotatably disposed in the frame, an endless tractor belt arranged to run on said drums, a toboggan disposed between the drums, said toboggan being carried by said frame, and means for adjusting the position of the toboggan with respect to the frame.

3. A tractor sled comprising a frame, a pair of drums rotatably disposed in the frame, an endless tractor belt arranged to run on said drums, a toboggan suspended from said frame and disposed between the drums, and means for raising and lowering the front end of the toboggan.

4. A tractor sled comprising a frame, a pair of drums carried by the frame, an endless tractor belt arranged to travel over the drums, a fuel tank disposed between the drums, said tank having a plurality of compartments, and means for shifting the fuel from one compartment to the other to change the center of gravity of the device.

5. A tractor sled comprising a frame, a pair of drums rotatably disposed in the frame, an endless tractor belt arranged to run on said drums, a toboggan suspended from said frame and disposed between the drums, and means for raising and lowering the rear end of the toboggan.

6. A tractor sled comprising a frame, a pair of drums rotatably mounted in the frame, each of said drums being provided with resilient surfaces, a toboggan suspended from the frame between the drums, and a web arranged to run over the drums and underneath the toboggan.

7. A tractor sled comprising a frame, means for supporting the frame on the snow, means for propelling the sled, a fuel tank carried by the supporting means, and pneumatic means operated from the driver's seat for shifting the position of the fuel in said tank to change the center of gravity of the sled at will.

8. A tractor sled comprising a frame, a pair of drums rotatably mounted in the frame, a resilient covering for each of said drums, a series of independent pneumatic tubes disposed between the covering and the periphery of the drum, and a toboggan suspended from the frame between the drums.

9. In a tractor sled, a frame, a rear drum rotatably mounted in the frame, a front drum rotatably mounted in the frame, an endless flexible band disposed about said drums, said band being of a width equal to the length of the drums, a steering wheel disposed in advance of the front drum, a seat disposed in the rear of the rear drum, and means for raising and lowering said steering wheel from the driver's seat.

10. A motor sled comprising a frame, a rear drum and a front drum rotatably mounted on said frame, an endless band disposed on said drums, said band comprising a web having relatively large meshes, and a toboggan secured to the frame at its front end and disposed above the web.

11. A motor sled comprising a frame, a rear drum and a front drum rotatably mounted on said frame, an endless band disposed on said drums, said band comprising a web having relatively large meshes, a toboggan secured to the frame at its front end and disposed above the web, and means for raising or lowering the front end of the toboggan.

12. A motor sled comprising a frame, a rear drum and a front drum rotatably mounted on said frame, an endless band disposed on said drums, said band comprising a web having relatively large meshes, a toboggan secured to the frame at its front end and disposed above the web, means for raising or lowering the front end of the toboggan, and additional means for raising or lowering the rear end of the toboggan.

13. A motor sled comprising a frame, a rear drum and a front drum rotatably mounted on said frame, an endless band disposed on said drums, said band comprising a web having relatively large meshes, a toboggan secured to the frame at its front end and disposed above the web, means for raising or lowering the front end of the toboggan, additional means for raising or lowering the rear end of the toboggan, a fuel tank carried by said toboggan, and means for shifting the fuel from one portion of the tank to another to change the center of gravity of the device at will.

14. In a motor tractor, a frame, a toboggan carried by the frame, a pair of drums rotatably mounted on the frame, an endless belt arranged to travel around the drums, said toboggan being disposed above the lower portion of the belt, a fuel tank having a plurality of compartments, said fuel tank being disposed on the toboggan, and means for shifting the fuel from one compartment to another to change the center of gravity of the device.

15. In a motor tractor, a frame, a toboggan carried by the frame, a pair of drums rotatably mounted on the frame, an endless belt arranged to travel around the drums, said toboggan being disposed above the lower portion of the belt, a fuel tank having a plurality of compartments, said fuel tank being disposed on the toboggan, and pneumatic mechanism for shifting the fuel from one compartment to another to change the center of gravity of the device.

16. In a motor tractor, a frame, a toboggan carried by the frame, a pair of drums rotatably mounted on the frame, an endless belt arranged to travel around the drums, said toboggan being disposed above the lower portion of the belt, a fuel tank having a plurality of compartments, said fuel tank being disposed on the toboggan, and pneumatic mechanism controllable from the driver's seat for shifting the fuel from one compartment to another to change the center of gravity of the device at will.

17. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, means for adjusting the height of the steering wheel, and common means for selectively actuating the rear adjusting means for the toboggan, the front adjusting means, and the steering wheel adjusting means at will.

18. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, means for adjusting the height of the steering wheel, common means selectively actuating the rear adjusting means for the toboggan, the front adjusting means, and the steering wheel adjusting means at will, a driver's seat disposed in rear of the rear drum, and means operable from the driver's seat for operating said selective means.

19. A tractor sled comprising a frame, a pair of drums rotatably mounted in the frame, each of said drums being provided with resilient surfaces, a web arranged to run over said drums, and spring means for keeping the web taut.

20. A tractor sled comprising a frame, a pair of drums rotatably mounted in the frame, each of said drums being provided with resilient surfaces, a web arranged to run over said drums, spring means for keeping the web taut, and means for adjusting the tension of the springs.

21. In a tractor sled, a frame, a rear drum and a front drum rotatably mounted on said frame, an endless belt arranged to travel over said drums, said belt comprising a web of coarse mesh, each of said drums having a layer of resilient material, and an outer layer of tire rubber.

22. A tractor sled comprising a frame, a pair of drums rotatably mounted on said frame, an endless web arranged to run over said drums, a toboggan disposed between said drums above the lower portion of the web, means for raising and lowering the front and rear ends of said toboggan, a steering wheel disposed in advance of the front drum, means for raising or lowering said steering wheel, and common means for actuating the raising or lowering means of the steering wheel, the front, and the rear of the toboggan, said means comprising a selector shaft, and means actuated by movement of the selector shaft for connecting the latter with the selected raising or lowering means.

23. A tractor sled comprising a frame, a pair of drums rotatably mounted on said frame, an endless web arranged to run over said drums, a toboggan disposed between said drums above the lower portion of the web, means for raising or lowering the front and rear ends of the said toboggan, a steering wheel disposed in advance of the front drum, means for raising or lowering said steering wheel, common means for actuating the raising or lowering means of the steering wheel, the front, and the rear of the toboggan, said means comprising a selector shaft, and means actuated by movement of the selector shaft for connecting the latter with the selected raising and lowering means, said steering wheel shifting means also comprising a flexible shaft movable with the steering wheel and capable of transmitting rotary movement of the selector shaft to the steering wheel raising and lowering means.

24. A tractor sled comprising a frame, a pair of drums rotatably mounted in the frame, one of said drums being a rear drum and serving as a main tractor, a tractor belt arranged to run over said drums, a toboggan suspended from the frame between said drums, separate means disposed at the rear end of the toboggan, at opposite sides thereof for raising or lowering the rear end, separate means disposed at the front end of the toboggan on opposite sides thereof for raising and lowering the front end, means for operating said rear end raising devices simultaneously and for operating the front end raising or lowering devices simultaneously.

25. A tractor sled comprising a frame, a pair of drums rotatably mounted in the frame, each of said drums being provided with resilient surfaces and a web arranged to run over said drums.

26. A tractor sled comprising a frame, a pair of drums rotatably mounted in the frame, a resilient covering for each of said drums and a series of independent pneumatic tubes disposed between said covering and the periphery of the drum.

27. A tractor sled comprising a frame, a pair of drums rotatably mounted in the frame, a resilient covering for each of said drums and a series of independent pneumatic tubes disposed between said covering and the periphery of the drum, said tubes being disposed in parallel relation longitudinally with respect to the axis of the drum.

28. A tractor sled comprising a frame, a pair of drums rotatably mounted in the frame, each of said drums having a series of longitudinal corrugations on its periphery, a cylindrical flexible covering surrounding said drum and spaced from the latter, said covering being provided with a series of grooves corresponding to the grooves on the drum and facing said latter grooves, a series of pneumatic tubes disposed in the registering grooves between the covering and the drum, each of said pneumatic tubes having an independent air valve.

29. A tractor sled comprising a frame, a pair of drums rotatably disposed in the frame, an endless tractor belt arranged to run on said drums, a toboggan disposed between the drums, adjustable means for suspending the front end of the toboggan from the frame, and adjustable means for suspending the rear end of the toboggan from the frame.

30. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, and a steering wheel disposed in advance of the front drum.

31. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, and means for adjusting the height of the steering wheel.

32. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, means for adjusting the height of the steering wheel, and common means for selectively actuating the rear adjusting means for the toboggan and the front adjusting means.

33. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, means for adjusting the height of the steering wheel, and common means for selectively actuating the rear adjusting means for the toboggan and the front adjusting means, simultaneously.

34. A tractor sled comprising a frame, a pair of drums rotatably disposed in the frame, an endless tractor belt arranged to run on said drums, a toboggan disposed between the drums, adjustable means for suspending the front end of the toboggan from the frame, adjustable means for suspending the rear end of the toboggan from the frame, a steering wheel disposed in advance of the front drum, means for adjusting the height of the steering wheel, and common means for selectively actuating the rear adjusting means for the toboggan, the front adjusting means, and the steering wheel adjusting means, at will.

35. A tractor sled comprising a frame, a pair of drums rotatably mounted in the frame, a resilient covering for each of said drums, a series of independent pneumatic tubes disposed between the covering and the periphery of the drum, a toboggan suspended from the frame between the drums, and a web arranged to run over the drums and underneath the toboggan.

36. A tractor sled comprising a frame, a pair of drums rotatably mounted in the frame, each of said drums having a series of longitudinal corrugations on its periphery, a cylindrical flexible covering surrounding said drums and spaced from the latter, said covering being provided with a series of grooves corresponding to the grooves on the drums and facing the latter grooves, a series of pneumatic tubes disposed in the registering grooves between the covering and the drum, each of said pneumatic tubes having an independent air valve, and a toboggan suspended from the said frame, for supporting the latter on the snow.

37. A tractor sled comprising a frame, a pair of drums rotatably mounted in the frame, each of said drums having a series of longitudinal corrugations on its periphery, a cylindrical flexible covering surrounding said drums and spaced from the latter, said covering being provided with a series of grooves corresponding to the grooves on the drums and facing the latter grooves, a series of pneumatic tubes disposed in the registering grooves between the covering and the drum, each of said pneumatic tubes having an independent air valve, a toboggan suspended from the said frame, for supporting the latter on the snow, and an endless web arranged to run over said drums and underneath the toboggan.

FRANK G. HORNER.

Copies of this patent may be obtained for five cents each, by addressing the "Commissioner of Patents, Washington, D. C."